March 14, 1933. R. E. POWERS 1,901,260
DUMP CAR
Filed Nov. 1, 1927 8 Sheets-Sheet 2
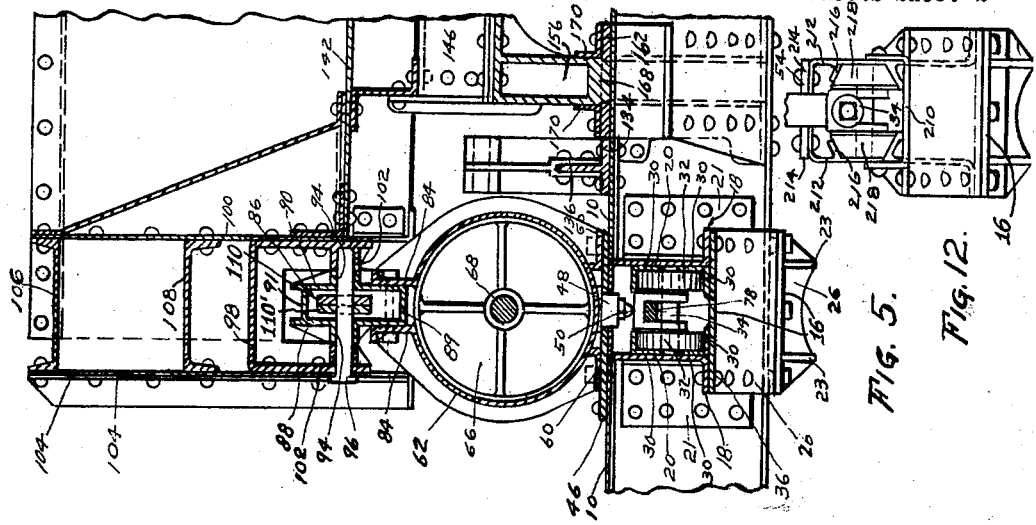
INVENTOR
Robt E Powers

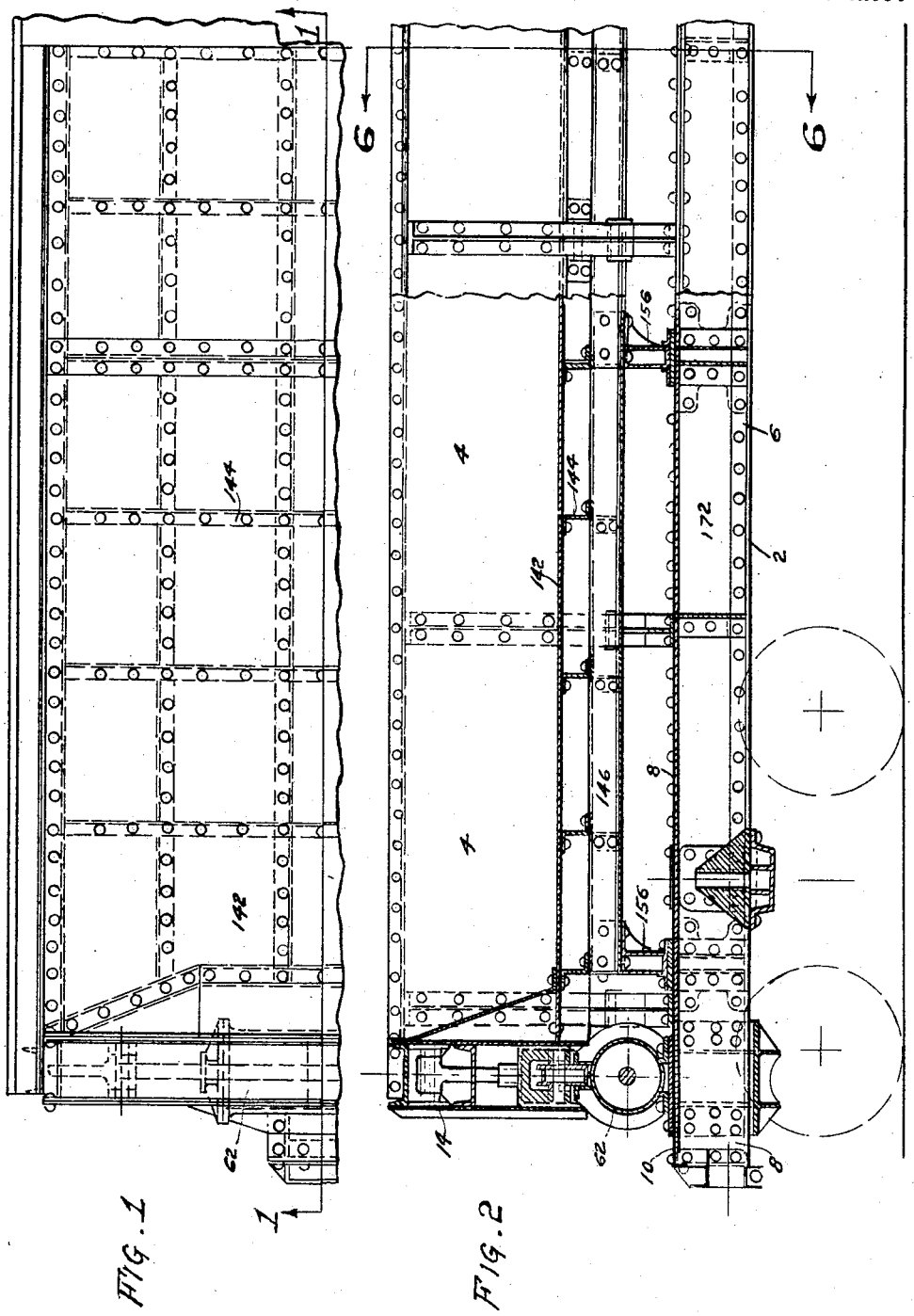

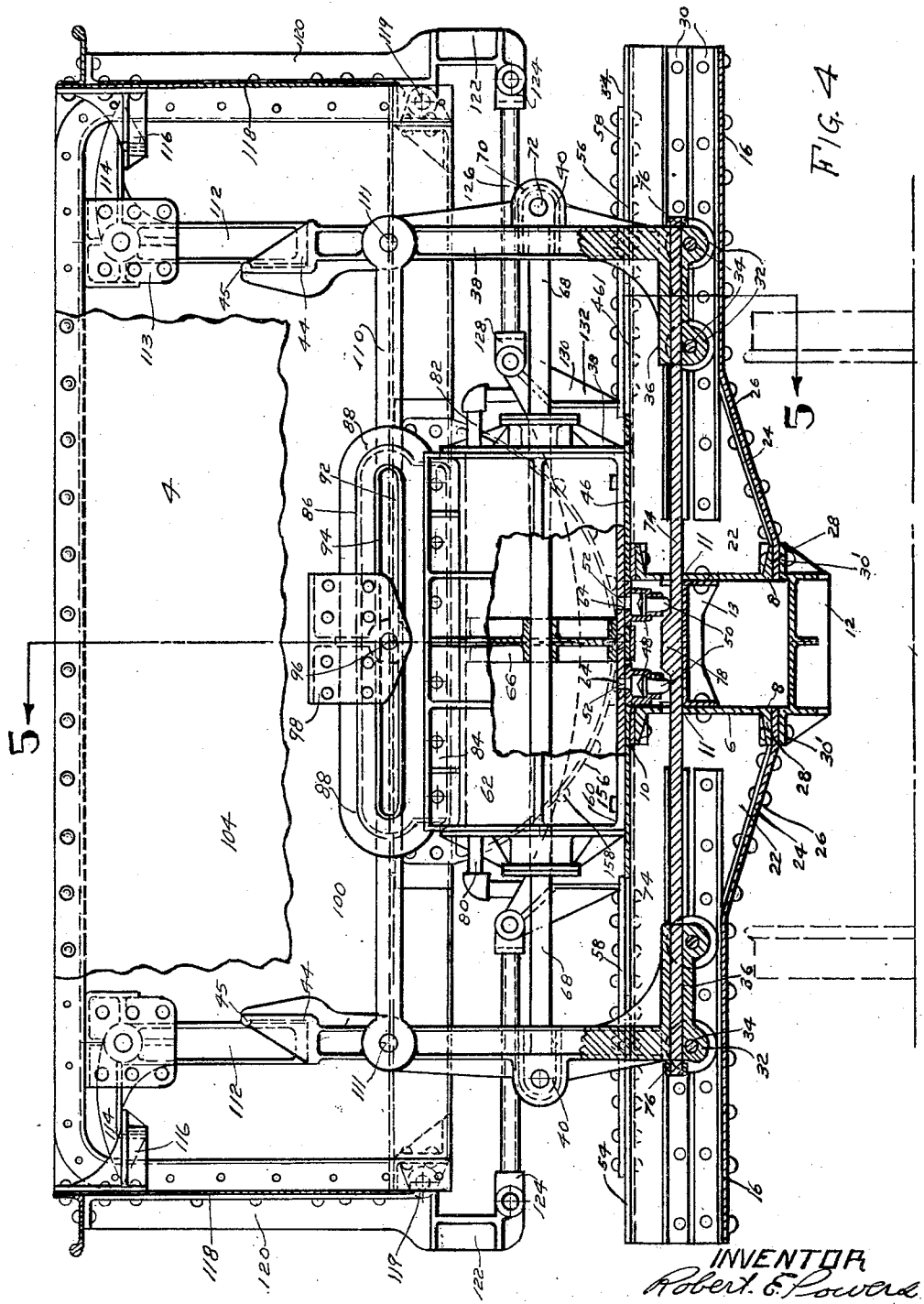

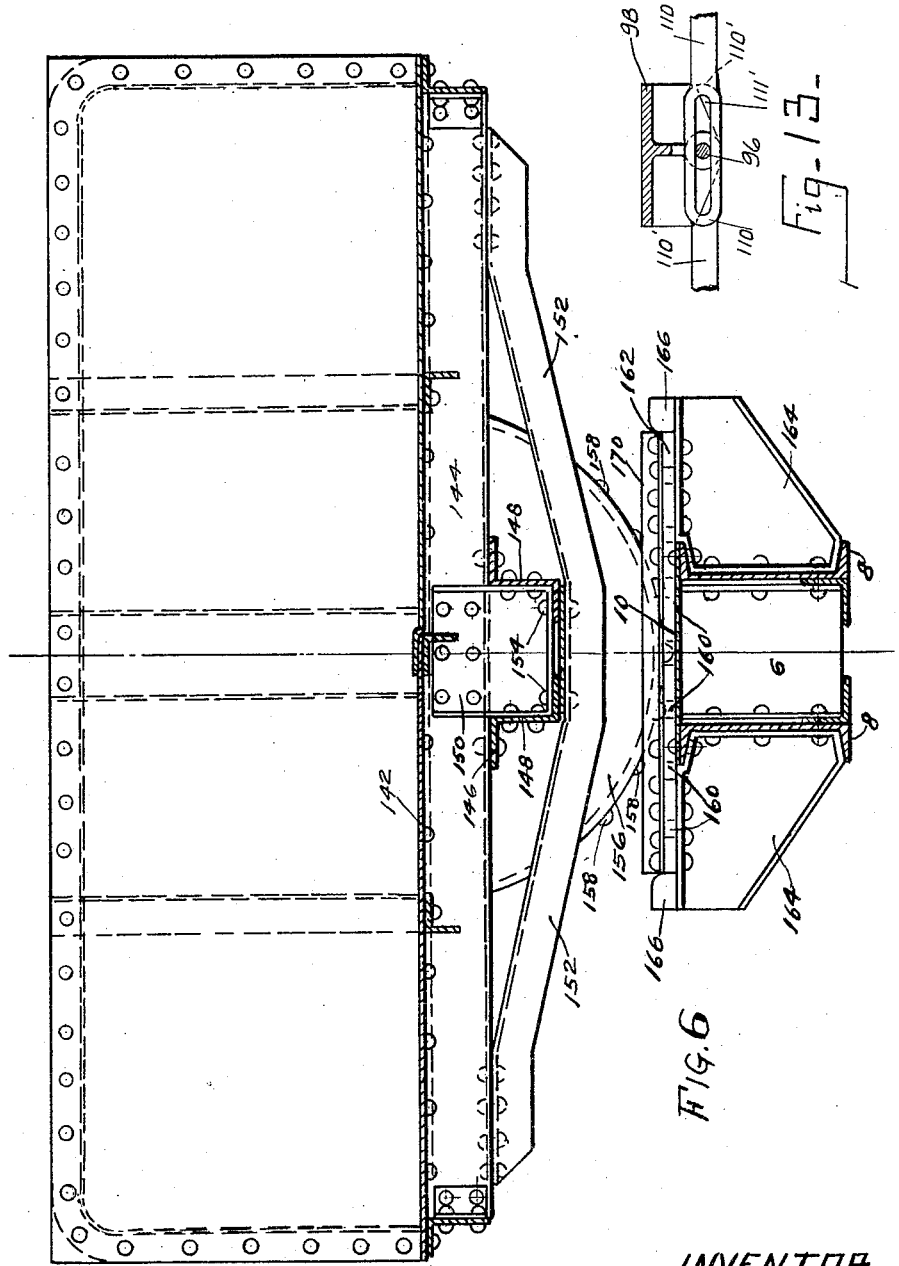

March 14, 1933. R. E. POWERS 1,901,260
DUMP CAR
Filed Nov. 1, 1927 8 Sheets-Sheet 5

INVENTOR
Robert E. Powers

March 14, 1933.　　　R. E. POWERS　　　1,901,260
DUMP CAR
Filed Nov. 1, 1927　　　8 Sheets-Sheet 6

INVENTOR
Robert E. Powers

March 14, 1933.  R. E. POWERS  1,901,260
DUMP CAR
Filed Nov. 1, 1927  8 Sheets-Sheet 7
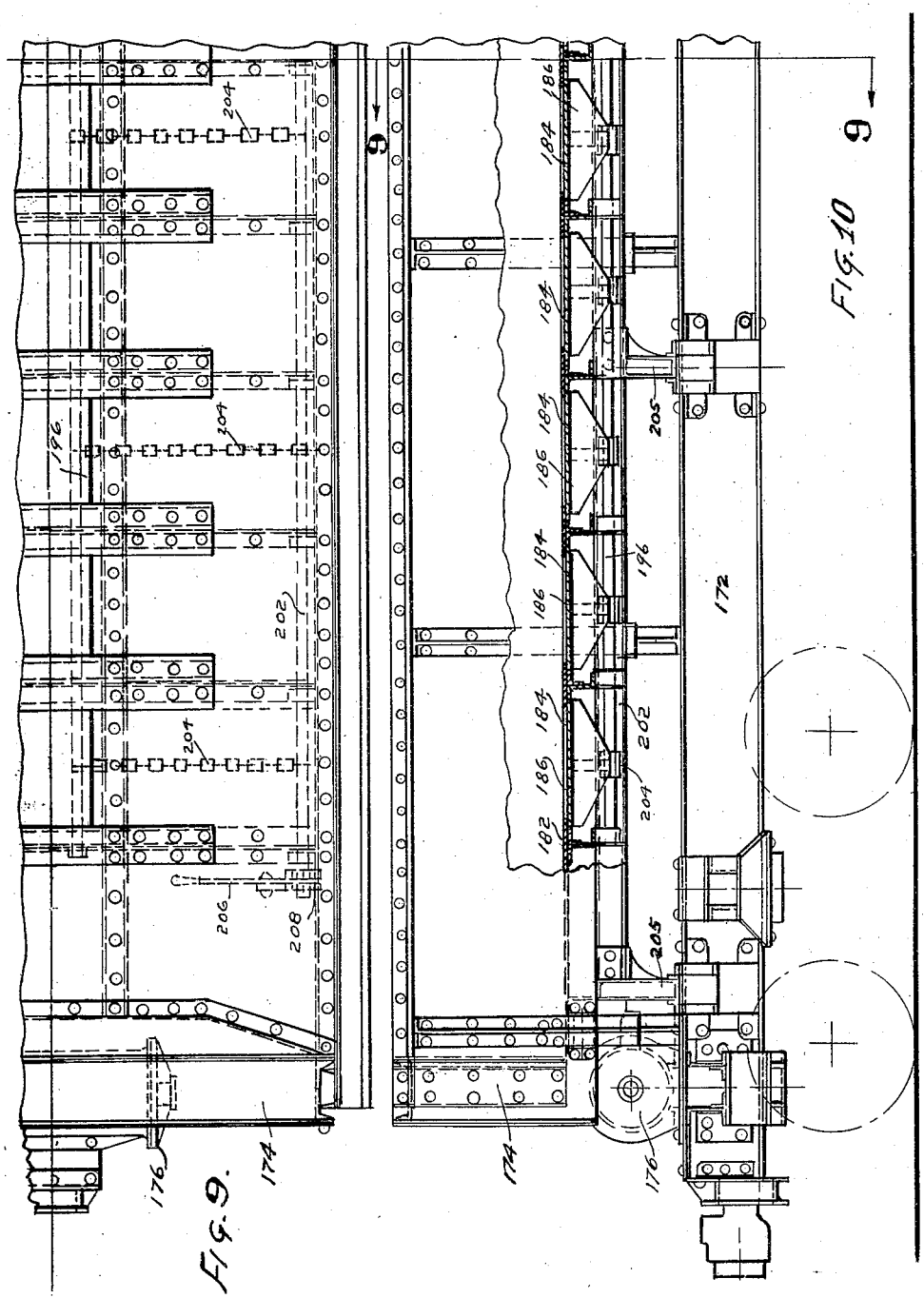
INVENTOR
Robert. E. Powers March 14, 1933.　　　R. E. POWERS　　　1,901,260
DUMP CAR
Filed Nov. 1, 1927　　8 Sheets-Sheet 8
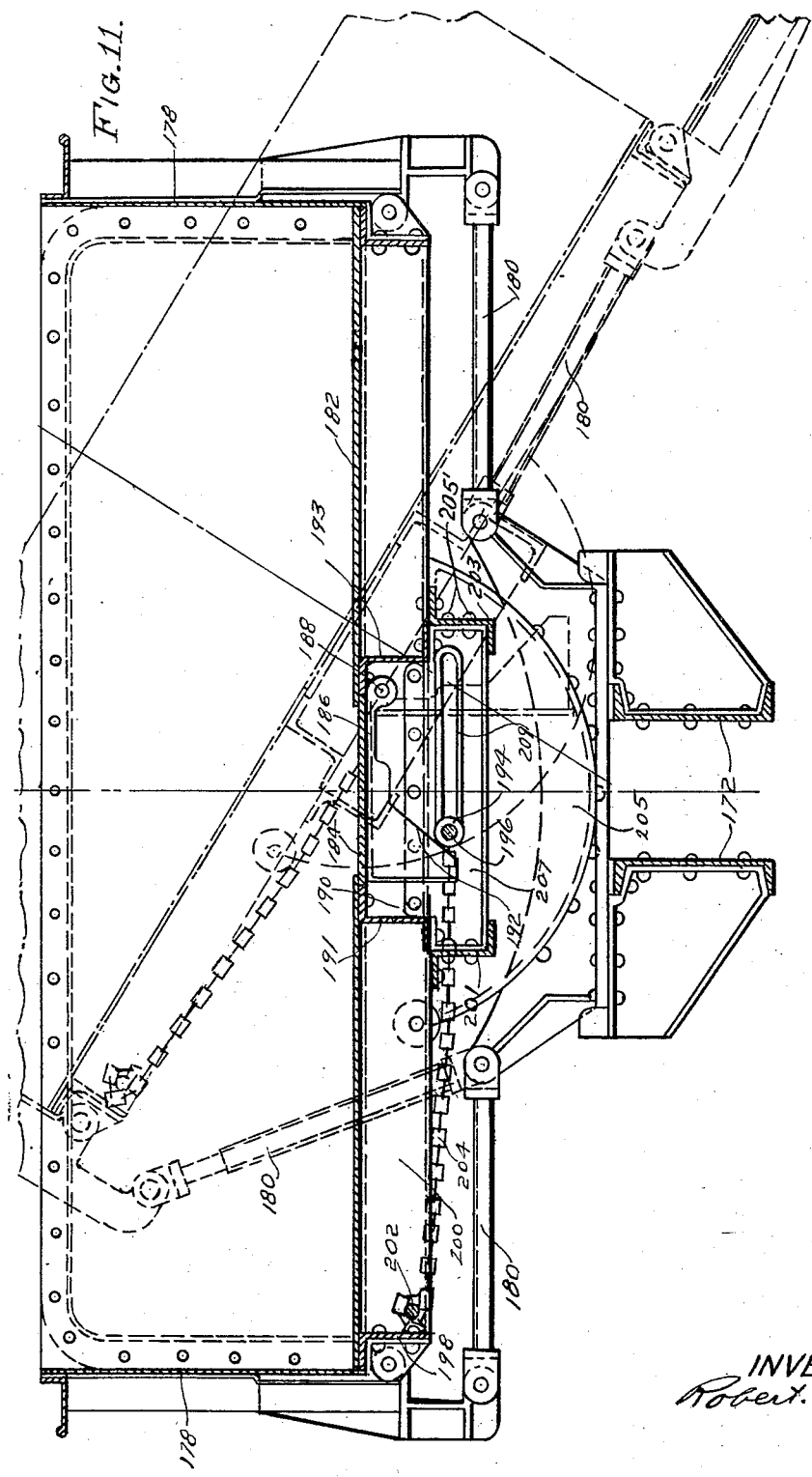
INVENTOR
Robert E. Powers Patented Mar. 14, 1933

1,901,260

UNITED STATES PATENT OFFICE

ROBERT E. POWERS, OF NEW YORK, N. Y.

DUMP CAR

Application filed November 1, 1927. Serial No. 230,257.

This invention in general relates to dump cars of the type in which pneumatically actuated mechanisms are caused to operate selectively so as to permit the car body to tilt toward the side on which the dumping is to be effected.

More particularly, this invention aims to provide a dump car of simple construction and one which is extremely strong and durable in operation.

One object of the invention is to provide a car of the character specified which will operate to dump a load with a minimum of pneumatic pressure.

Another object of the present invention is to provide a dump car having a simplified form of body support in which rocking or wearing strains originating in the car body when in normal position are transferred to the underframe through rugged underframe parts.

Another object of the invention is the provision of a simplified form of body supporting and locking mechanism in which rocking or wearing strains originating in the car body while in its normal righted position are transferred directly to the underframe through rugged parts particularly designed to receive and distribute such strains, and which parts do not interfere with the usual bolster constructions.

Other objects and advantages of this invention will be apparent from the following description taken in conjunction with the accompanying drawings in which:

Figure 1 is a fragmentary top plan view of the dump car of the present invention;

Fig. 2 is a partial sectional view of the car taken on the line 1—1 of Fig. 1;

Fig. 3 is a side elevation of one end of the car;

Fig. 4 is a sectional view on the line 3—3 of Fig. 3;

Fig. 5 is a sectional view on the line 5—5 of Fig. 4;

Fig. 6 is a sectional view on the line 6—6 of Fig. 2;

Fig. 9 is a top plan view of a modified form of car;

Fig. 10 is a side elevation, partly in section, of the modified construction shown in Fig. 9;

Fig. 11 is a sectional view on the line 9—9 of Fig. 10;

Fig. 12 is a fragmentary view showing a modified form of the trackways shown in Figs. 3 and 5, and Fig. 13 is a fragmentary detail view, partly in section, showing the connection of the tension rod links to the car body.

Figure 7:
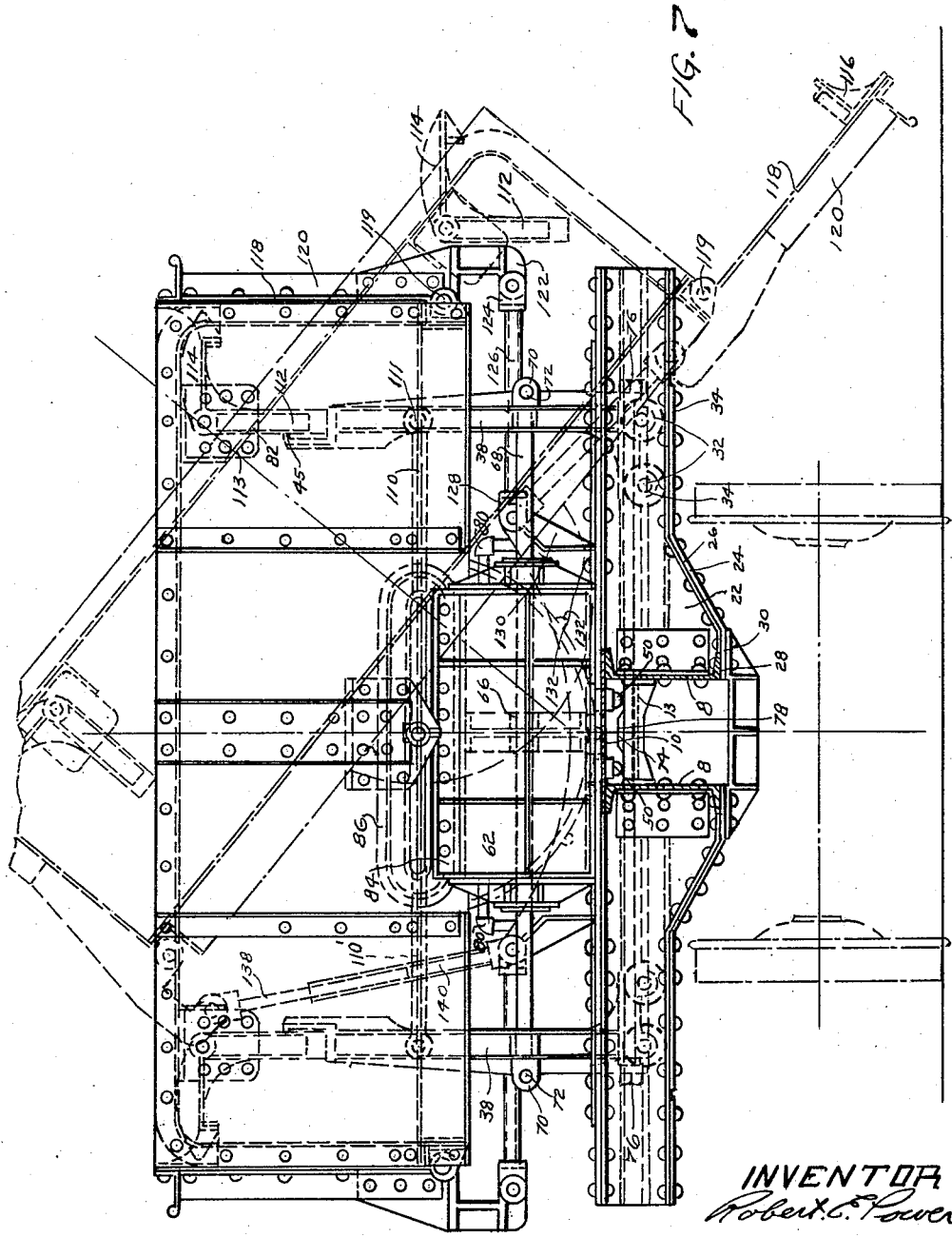
Fig. 7 is an end view of the car of the present invention, showing the body in dumping position in dot and dash lines.
Figure 8:
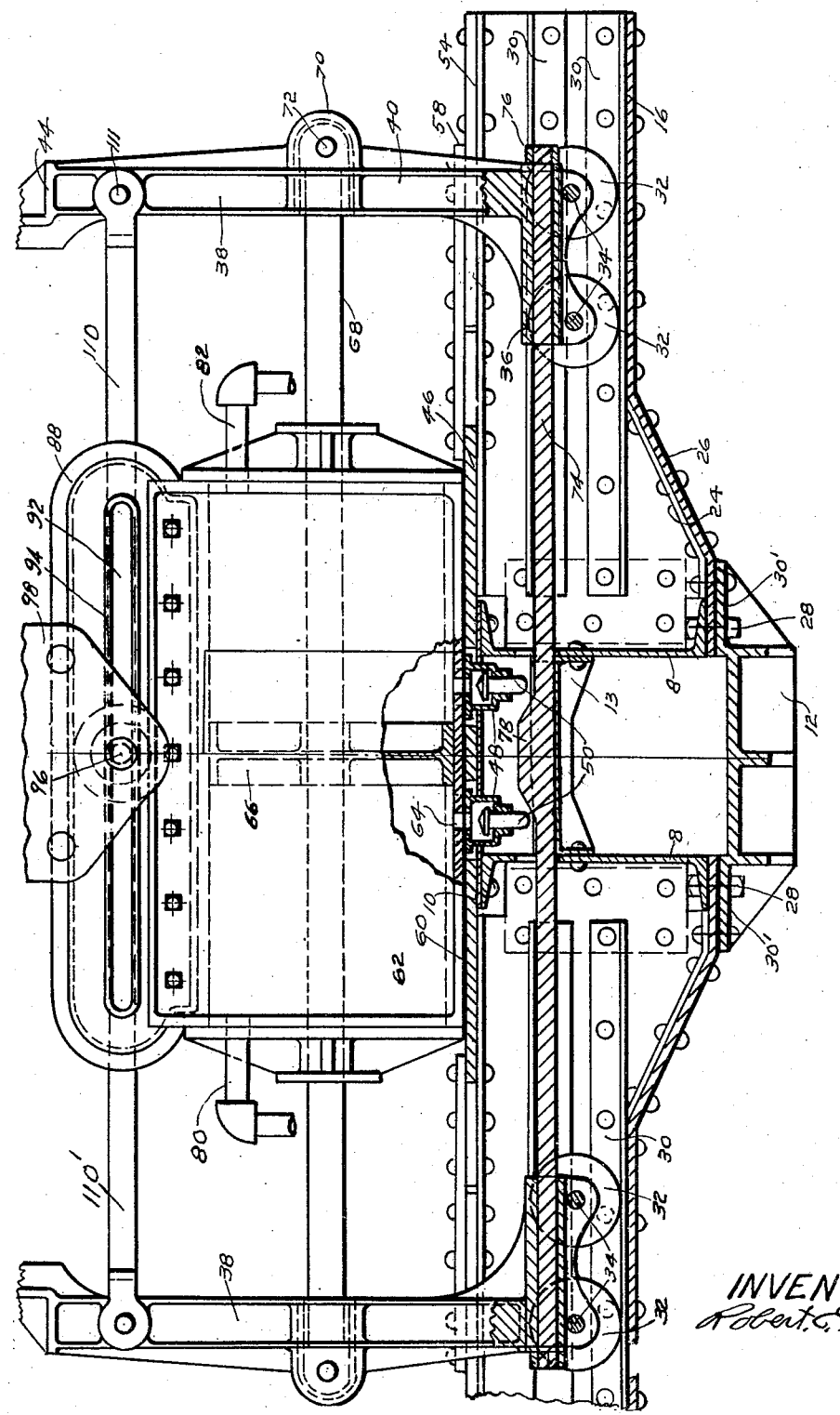
Fig. 8 is a partial sectional view taken at the end of the car showing the particular operating means for dumping.

Referring now more particularly to the drawings, a car underframe is indicated generally at 2 and a car body at 4, the latter being mounted for lateral dumping movement on the underframe 2.

Referring specifically to the underframe 2, there is shown a center sill or girder 6 formed of the spaced sills 8 and a top plate 10. The sills 8 are provided with alined openings 11 and a supporting spacer 13 secured to said sills adjacent the openings by suitable means such as rivets or the like.

At opposite ends of the center girder 6 and adjacent the ends of the car body are end constructions designated generally in Fig. 2 as 14 of which only one is shown, it being understood that the end constructions are identical and that a particular description of one suffices for both. As shown more clearly in Figs 3, 4 and 5, the end structure 14 includes relatively wide supporting plates 16 secured to the lower outturned flanges 18 of spaced web plates 20 in the form of Z-bars, said supporting plates and web plates extending transversely of the center girder 6 and being secured thereto by means of angles 21. Each plate 16 is reinforced by integral ribs 23 as clearly illustrated in Fig. 5. As shown in Fig. 4, the web plates 20 are provided with a diaphragm portion 22 flanged at 24 to connect with a downwardly projected portion 26 of the supporting plate, and the end of this projected portion is received between the flange 28 of the sills 8 and an outwardly extended flange 30' of a tie casting 12, and said projected portion and flanges 28 and 30' are riveted or otherwise secured together to form a rugged unitary structure. The parts of the end construction 14 are identical on each side of the central girder, and a description of one suffices for both.

Secured to the plates 20 are trackways each formed of a pair of angles 30, the trackways extending toward the center girder 6 to a point adjacent the latter and accommodating bearing blocks comprising the rollers 32 which are connected by axles 34; each bearing block supporting the lower elongated bifurcated end 36 of a strut element 38. The strut element 38 extends upwardly and a portion 40 thereof is provided with an opening through which extends a piston rod hereinafter described, and the extreme end is formed into an open socket 44 having on its upper end a push finger 45. As will be clearly pointed out hereafter, the strut of which element 38 is a part supports the car body and is formed of upper and lower sections 38 and 112; element 38 being the lower section. From an inspection of Fig. 4 it can be seen that two struts are provided at the end of the car, but a description of one suffices for both.

The spaced web plates 20 are provided with a cover plate 46 which extends across the center sill as clearly shown in Fig. 4, and said cover plate is provided with suitable openings through which extend valve casings 48 having valves 50 therein, said valve casings being secured to and connecting a cylinder hereafter described. As particularly shown in Fig. 4, the cover plate 46 is relatively short and is slotted for a portion of its length as indicated at 46' and each of the plates 20 has secured to the upper flange thereof an inwardly extending plate 54, the inner edges of the plates 54 defining a slot 56 which permits lateral movement of the strut element 38 as described hereafter in the operation of the device. A splice bar 58 is provided for reinforcing purposes, the same being secured to the plates 46 and 54 across the meeting edges thereof. The construction of the cover plate and the cooperating plates 54, as shown in the drawings, is merely by way of example, as obviously, the cover plates may extend the full length of the web plates 20 and across the center sill and have a slot formed in each end thereof within the spirit of the invention.

Mounted on the plate 46 and secured thereto by rivets or the like extending through integral flanges 60, is an air cylinder 62 to which the valve casings 48, heretofore mentioned, are secured. Within this cylinder 62 is a reciprocating piston 66 having a piston rod 68 (heretofore mentioned) extending therethrough and through the opposite ends of the cylinder. The extreme ends of the piston rod 68 extend through the beforementioned openings in the strut element 38 and are connected to the latter by means of a pin 72 extending through a casting 70 formed on the strut elements.

A valve rod 74 is provided which extends through the openings in the side plates 8 and its opposite ends are extended through the opposite carriages 36; the two carriages being connected to said rod 74 by nuts 76. Substantially midway of the ends of this valve rod 74 is a valve operator 78 which, in the instance shown, is an enlargement or cam so arranged as to be normally positioned between the valves 50 when the car body is in the position illustrated in Fig. 4 but which is adapted to contact with said valves 50 upon movement of the valve rod 74. Communicating with each end of the cylinder 62 is an air line as indicated at 80 and 82.

Referring now to Fig. 5, the cylinder 62 is provided with upwardly extending spaced flanges 84 which define between them an elongated socket within which is secured by rivets or the like a guide 86, which, in the instance shown more clearly in this figure, is formed of front and back plates 88 and 90 respectively and bottom and top plates 89 and 91, respectively. The front and back plates 88 and 90 are each provided with a slot 92 formed therein and a marginal flange 94 is formed around the edge of each slot to provide a bearing surface for a guide pin 96 carried by the reinforced guide casting 98 secured to the end 100 of the car body. The guide casting 98 may be, and preferably is, provided with oppositely arranged bearings 102 for the guide pin. The parts just described are received within a housing, formed by the end 100 of the car body and a spaced diaphragm 104 connected to the end 100 by a channel 106 extending down both sides of the car and across the top thereof, said channel defining a top and side portions for the end construction and housing. A suitable reinforcing spacer plate 108 is also provided intermediate the ends of the housing secured to the end 100 and the plate 104.

Connecting the strut elements 38 at points 111 below the sockets 44 is a tie or tension rod formed of connected sections 110 and 110'. As clearly shown in Fig. 13, the adjacent ends of sections 110 and 110' lap each other and are provided with elongated slots 111' through which pin 96 extends; the rods being thereby connected to the body by a lost motion arrangement whereby they may shift relative to the body before pin 96 contacts with the ends of the slots, continued shifting of the rods actuating the car body to dumping position as will be obvious. The tension rods, as will be apparent, serve as rocking links acting under tension to actuate the body to dumping position and also toward normal righted position.

The sockets 44 each removably mount the lower end of a bell crank or lock arm 112 pivotally secured to a casting 113 secured to the car body, and the short arm of said crank is formed into a latch 114 which engages within the latch keeper 116 formed on a side gate 118 hingedly connected at 119 to the car body. When the parts are in the position illustrated in Fig. 4, it will be apparent that the strut elements 38 and their associated lower bell crank arms serve to support and retain the car body in its normal position without the employment of other agencies such as shackle chains or hooks. Suitable openings 119' are provided in the housing for receiving the keeper when the gate is in closed position. The gate 118 carries a reinforcing rib 120, and the lower end of this rib is formed into an angle 122 having an inwardly directed socket 124 which pivotally secures one end of an operating lever 126. The other end of lever 126 is connected with a socket 128 formed on the upright extension 130 of a bracket 132 secured to the top plate of the center sill. In practice, it has been found satisfactory to form the bracket of two sections and in Fig. 5 an inverted T 134 is shown, the same being riveted to the top plate 10 and the extensions 130 are preferably cast to the form shown in said Fig. 5 providing a lower slotted piece 136 which is secured to the leg of the T by suitable means such as rivets or the like.

It has been found necessary to form the lever 126 of telescopic sections to compensate for certain play in the several parts during the dumping operation, and to that end each lever 126 is formed of telescoping sections 138 and 140 respectively (see Fig. 7) and when said sections are fully telescoped, the end of socket 124 will abut the end of section 140.

Referring now to Figs. 2, 5 and 6, in which are shown the car body details, 142 indicates the floor of the car, the same being supported by spaced Z-bars 144 arranged transversely of the body and riveted to a substantially U-shaped sill 146 extending longitudinally of the car body and immediately over the center sill or girder 6. The sill 146 is more clearly illustrated in Fig. 6, and comprises opposed Z-bars 148 having their upper legs riveted to the Z-bars 144; the bars 148 being so placed as to provide a substantial space between the webs thereof within which is secured a brace 150 riveted or otherwise secured to the bars 148 and to the bars 144.

A truss 152 is provided adjacent each floor beam, said trusses each being connected at each end thereof to the ends of each Z-bar 144, the trusses 152 extending beneath the sill 146 and serving as a support for the latter, being riveted thereto as shown at 154.

For mounting the car body, rockers 156 are provided which are secured to the body and are substantially of arcuate shape. The edges of these rockers are each formed with projections or knobs 158 which are adapted to engage within complementary depressions 160 formed in a rack plate 162 secured to the center girder 6, the latter being provided with marginally flanged supporting web castings 164 secured thereto and provided with retaining shoulders 166 serving as stops for limiting the movement of the body. As shown more clearly in Fig. 5, the rocker 156 is substantially a hollow casting having a base 168, on which the knobs 158 are formed. This base is mounted for movement on the rack plate 162, as before-mentioned, and angles 170 secured to the plate 162 define between them the channel in which the rocker 156 moves. The construction just described, it is obvious, provides, in effect, a rack and pinion mounting to permit rocking movement of the car body. At this point, it is desirable to call attention to the specific mounting of the car body for rocking movement, in connection with the particular operating means therefor, and referring again to Figs. 4 and 7, which have previously been described, it can be seen that when fluid pressure is admitted to the left hand portion of the cylinder, the car body will be moved toward the right, the guide pin 96 moving in the slot 92 while at the same time the body will rock on the rockers 156 in an arc, the center of which is much below the bottom of the car body.

Referring now to Figs. 9, 10 and 11, wherein is shown a modified form of the invention, it can be seen that the fundamental or underlying inventive concept of the other figures of the drawings is maintained here, the car comprising the center sill 172, the end construction 174, the operating cylinder 176, the side gates 178 together with the operating levers 180 therefor, all similar to the corresponding parts shown in Figs. 1 to 8, inclusive.

The car shown in Figs. 9 to 11, however, differs from that shown in the other figures in providing a bottom discharge means, and as clearly shown in Fig. 10, the car bottom 182 is provided with a plurality of discharge openings 184 which are each normally closed by a gate 186 pivotally mounted at 188 (see Fig. 11), within a discharge outlet casing indicated generally at 190 and formed preferably of spaced Z-bars 191 and 193 riveted or otherwise secured to the car bottom 182 adjacent the openings 184 therein. As shown distinctly in Fig. 11, each gate 186 is provided with a depending cam face 192 which is in contact with a roller 194 carried by a horizontally moving retaining element 196 which in the instance shown is a rod. If desired, the roller 194 may be omitted and the cam face may act directly on the rod 196 within the spirit of the invention.

The sides of the car have secured thereto at the car bottom, an angle 198 to which are connected the cross-beams 200, this construction being similar to the construction disclosed in the car in Figs. 1 to 8, inclusive. Secured to the lower flanges of the cross-beams 200 and extending longitudinally of the car body are spaced Z-bars 201 and 203 respectively, which also extend through suitable openings provided in the rockers 205 (similar to the rockers shown in Figs. 1 to 8, inclusive), and extending between and connected to each of these Z-bars 201 and 203 by means of rivets 205′ or the like, are webs 207 each provided with a horizontally arranged slot 209, within which slots the rod 194 is adapted to move.

Extending longitudinally of the car and mounted for rotation in the before-mentioned cross-beams 200 is an operating arm 202 to which are secured one end of flexible connectors 204, one for each of the gates 186, and the other end of each of these connectors 204 is connected to the retaining rod 196. One end of the operating arm 202 carries a lever 206 cooperating with suitable ratchet means 208 to retain the lever and its associated operating arm 202 in predetermined positions in a manner well understood. It will be apparent that upon rotation of the arm 202 in one direction, connectors 204 will be loosened thereby permitting the gates 186 to swing downwardly on their pivots and thus permit the lading in the car body to be discharged through the openings 186. A reversal of rotation of the rod 202 will draw the operating arm 196 toward the left, see Fig. 11, and the rollers 194 on the operating arm by engagement with the cam faces 192 will force the gates 186 to closed position.

Figure 12 shows a modification of the roller structure shown at 20 and 32 in Figs. 3 and 5; and it can be seen that a U-shaped support 210 is secured to the plate 16, said support mounting opposed castings 212 provided with attaching flanges 214 by which said castings are secured to the plate 54. The castings 212 are each formed with diverging guides or trackways 216 within which are mounted for movement the frusto-conical rollers or wheels 218 connected by the axle 34; this construction affording substantially complete protection for the rollers from dirt or other foreign matter.

In the operation of the present invention with the parts thereof in the position illustrated in Fig. 4, the car body is retained in its upright position by means of the strut elements 38 with the cooperating lower ends of the angles 112 and it will be apparent that the car body is securely retained in such position due to the engagement of the latches 114 with their cooperating keepers.

It will further be apparent that the car body is also retained in the position illustrated in said Fig. 4 by means of the levers 126 and the side gates 118. When it is desired to dump the car, fluid under pressure is admitted to either side of the piston 66 within the cylinder 62, depending upon the side on which the tilting is to be effected and for the purposes of this case, we will consider Fig. 7. To dump the car to the right as shown in said Fig. 7, the fluid under pressure is admitted through the air line 80 into the adjacent portion of the cylinder, and such fluid will move the piston 66 to the right such movement carrying the strut element 38 to the right breaking the bearing and locking joint at the socket 44 of the strut element, the finger 45 urging the lower end of the angle 112 in an outward direction until the latch 114 is released from its engagement with its keeper 116 whereupon the side gate 118 will swing on its hinge 119. After the latch 114 has been released, continued movement of the strut will cause rod 110 to act against pin 96 to force the body to be carried to the right, the guide pin 96 working in the slot 92 on the bearing flanges thereof until said pin reaches substantially the end of said slot, and during this movement, the car body will rock due to the engagement of the rocker plate 156 with its rack plate 162 until the body assumes the position shown in dot and dash lines in Fig. 7, whereupon the lading in the car will be discharged through the openings in the sides thereof formed by the swinging of the end gates. The lost motion connection of the links 110 and 110′ with pin 96 is such as to permit movement of the strut and links relative to the body to an amount sufficient to release the latch prior to commencement of the dumping movement of the body.

During the movement of the piston 66 as a result of fluid pressure exerted thereagainst, the valve rod 74 due to its connection with the carriage at the lower end of the strut element 38 will be moved correspondingly, and the surface 78 of said valve rod will engage the adjacent valve 50 and open a discharge through the valve casing from the cylinder on the opposite side of the piston 66 to exhaust air in said cylinder portion in advance of the approaching piston 66. When the surface 78 has completely passed the valve 50 against which it is operated, the valve 50 will be receded and thus close any outlet from the cylinder to the atmosphere therethrough and the remaining air in that portion of the cylinder will be exhausted through the air line 82 in advance of the approaching piston 66.

After the lading in the car has been dumped, to replace the body to the position shown in Fig. 4, the fluid under pressure is then passed into the right-hand portion of the cylinder 62 through the air line 82, urging the piston 66 back to its normal position, and the reverse of the operation just described will occur; in other words, the piston will be forced to the left until the surface 78 of its associated valve rod 74 engages the adjacent valve 50 whereby to open a discharge from the cylinder through the valve casing of said valve which will permit the exhaust of fluid under pressure directed to the atmosphere and prevent the further traveling of the piston 66 by reducing the pressure exerted thereagainst. Prior to the complete positioning of the car body, it is apparent that the weight of said body will be sufficient to cause the latter to drop by gravity to the position shown in said Fig. 4 and the lower ends of the angles 112 will assume their position within the sockets 44, the car thus being normally positioned.

What is claimed is:

1. In a dump car, a body, an underframe comprising a center sill and transverse members adjacent each end thereof, rocker elements secured to the body and working on the center sill for tilting the body, sectional strut elements carried by the transverse members for supporting the body in normal position, and fluid pressure means for moving said strut elements to separate the sections whereby to permit the body to tilt.

2. In a dump car, a body, an underframe comprising a center sill and transverse members adjacent each end thereof, rocker elements connected to said body and mounted on the center sill for tilting said body, connected sectional strut elements mounted for lateral movement on the transverse members, said strut elements supporting the body in normal position, fluid pressure means for moving said strut elements to free the latter from body supporting position, and side gates normally retained in closed position by said strut elements.

3. In a dump car, a body, an underframe comprising a center sill and transverse members adjacent each end thereof, means mounting the body for tilting movement, opposed sectional strut elements mounted for movement on the transverse members and supporting the body in normal position, means connecting the strut elements to form a unitary structure, and fluid pressure means connected to said structure for moving the strut elements whereby to disconnect the sections thereof to permit the body to tilt.

4. In a dump car, a body, an underframe having a center sill and transverse members adjacent each end thereof, means secured to the body and working on the center sill for supporting the body for tilting movement, a fluid pressure cylinder having a piston, a piston rod connected to the piston and extending through the cylinder, a guide carried by the cylinder, a guide pin secured to the body and working in said guide, sectional strut elements for supporting the body in normal position, said strut elements being movable in the transverse members, means connecting said strut elements to form a unitary structure, the ends of said piston rod being connected to said strut elements whereby actuation of the piston moves the strut elements laterally to disconnect the sections of at least one thereof to permit the body to tilt.

5. In a dump car, a tiltable body, an underframe supporting said body and comprising a center sill and transverse members adjacent each end thereof, opposed sectional strut elements mounted for movement on the transverse elements, said strut elements supporting the body and locking the same in normal position, means connecting said strut elements to form a unitary structure, and fluid pressure means for moving said unitary structure laterally on the transverse members to disconnect the sections of at least one of the strut elements whereby to unlock the same from the body to permit the latter to tilt.

6. In a dump car, a tiltable body, an underframe supporting the body and comprising a center sill and transverse members adjacent each end thereof, trackways in said transverse members on each side of the center sill, opposed sectional strut elements supporting and locking the body in normal position, a carriage at the end of each strut element and movable in said trackways, and fluid pressure actuated means for moving said strut elements to unlock the same from the body to permit the latter to tilt.

7. In a dump car, an underframe comprising a center sill and transverse members adjacent each end thereof, rocker elements secured to the body and working on the center sill for mounting the body, fluid pressure actuated means movable on the transverse members for tilting the body, the center of rotation of the body being a substantial distance below the floor of the body.

8. In a dump car, a body having side gates hinged thereto adjacent the floor, an underframe having a center sill and transverse members adjacent each end of said sill, trackways in said transverse members on each side of the center sill, opposed strut elements for supporting and locking the body in normal position, a carriage mounting the lower end of each strut element, said carriages being journaled in said trackways for movement therein, means connecting the carriages, a sectional bar connecting the strut elements, a fluid pressure cylinder mounted above the transverse member and provided with a piston, a piston rod extending through the cylinder and connected to said strut elements to move the latter in response to fluid admitted into said cylinder whereby to release the strut elements from their engagement with the body.

9. In a dump car, a body having side gates hinged thereto adjacent the floor, an underframe having a center sill and transverse members adjacent each end of said sill, trackways in said transverse members on each side of the center sill, opposed strut elements for supporting and locking the body in normal position, a carriage mounting the lower end of each strut element, said carriages being journaled in said trackways for movement therein, means connecting the carriages, a valve operator on said carriage connecting means, a bar connecting said strut elements, a fluid pressure cylinder having a piston normally positioned intermediate the ends thereof, valves carried by said cylinder having depending stems, a piston rod extending through the cylinder and connected to the strut elements to move the latter in response to fluid admitted into said cylinder, said valve operator engaging the valves to permit exhaust of air from the cylinder in advance of the piston.

10. In a dump car, an underframe, a body rockably mounted thereon, side gates for the body, transversely movable sectional strut elements carried by the underframe for normally retaining the body against rocking, and fluid pressure means for actuating the strut elements to separate the sections thereof to permit the body to rock.

11. In a dump car, an underframe, a body mounted on the underframe for tilting movement, side gates for the body hinged to the lower edge of the latter, connected transversely movable sectional strut elements mounted on the underframe for normally restraining the body against tilting, one of each of the sections of said strut elements serving as a gate latch, and fluid pressure means connected to said strut elements for moving the latter transversely of the body to separate the sections whereby to free the gates for swinging movement on the hinges and for permitting the body to tilt.

12. In a dump car, an underframe, a body, side gates for the body, means working on the underframe for supporting the body for rocking movement, a fixed cylinder carried by the underframe, a piston in the cylinder and having a piston rod extended from both ends thereof, connected truck elements movable transversely of the frame, strut elements secured to said truck elements, the ends of said piston rod being secured to said strut elements whereby movement of the piston actuates said strut and truck elements, and door latching elements pivoted to the body and normally engaged with the strut elements to restrain the body against rocking, transverse movement of the strut elements freeing the latch elements from their engagement with the gates and with the strut elements to permit the body to rock.

13. In a dump car, a tiltable car body provided with a side door, a strut for supporting the body in righted position including a lock for the door, mechanical means for tilting the car body, and pneumatically actuated means for effecting a movement of the strut, a movement of the door lock into inoperative position and a subsequent tilting of the car body.

14. In a dump car, an underframe, a car body mounted thereon for lateral dumping movement, a sectional strut at the end of the car body for normally supporting the latter in righted position, the upper end of said strut being pivotally connected to the car body and the lower end being supported and shiftable transversely of the underframe, and pneumatically actuated means including a piston rod for shifting the lower strut section to disconnect the strut sections whereby the strut is freed from supporting engagement with the car body.

15. In a dump car, the combination of an underframe, a car body mounted thereon for lateral dumping movement, a body supporting strut supported by and shiftable transversely of the underframe, said strut having a locking element normally locked with said car body, and pneumatically operated mechanism supported on the underframe for actuating the strut element to cause the locking element to be released from the car body whereby the latter may be dumped.

16. In a dump car, an underframe, a car body mounted thereon for lateral dumping movement, strut elements at each end of the car for normally supporting the body in righted position, and pneumatically actuated mechanism for shifting the strut elements transversely of the underframe to free said strut elements from body supporting position.

17. In a dump car, an underframe, a car body mounted thereon for lateral dumping movement, spaced connected strut elements at each end of the car for normally supporting the body in righted position, means connecting the strut elements to the car body and permitting relative movement therebetween, and pneumatically actuated mechanism for shifting the strut elements transversely of the underframe to free the latter from body supporting position and for moving the car body to dumping position.

18. In a dump car, an underframe having a center sill, a transverse member at the end of the underframe, and providing oppositely arranged housings, a bearing block slidably mounted in each housing, a transversely extending cylinder secured to said transverse member, a piston rod projecting from the ends of the cylinder, a sectional strut carried by each bearing block and to which the piston rod is secured, a car body mounted for lateral dumping movement on the underframe, and means connecting the struts and connected to the body whereby upon actuation of the piston rod said strut actuate the connecting means to dump the car body.

19. In a dump car, an underframe, a car body mounted thereon for lateral dumping movement, and mechanism for controlling the dumping movement arranged under end exteriorly of the car body, said mechanism including a cylinder having a piston rod projecting from each end thereof, and a combined body supporting strut and car body rocking link at each end of the cylinder and each operatively connected to the piston rod to be actuated thereby.

20. In a dump car, an underframe, a car body mounted thereon for dumping movement in both lateral directions, and pneumatically actuated means for effecting said dumping movement selectively in either direction, said means including a single transversely disposed cylinder mounted on the underframe and having a piston rod projecting from the ends thereof, a pair of car body rocking links pivotally secured to the car body, and car supporting struts secured to the piston rod and normally supporting the body in righted position, said rocking links being connected to the struts to be actuated thereby to dump the body selectively in either direction.

21. In a dump car, an underframe, a car body mounted thereon for dumping movement in both lateral directions, pneumatically actuated means for selectively dumping the car body in either direction desired, said means including a cylinder having a piston rod projecting in opposite directions from the ends thereof, sectional struts normally supporting the car body in righted position, said struts having their lower portions connected to the piston rod for lateral shifting upon movement of the piston rod, a pair of tension rods each connected respectively to a strut and to the car body and each adapted on lateral shifting of its associated strut to tilt the car body in the direction in which the piston rod is moved.

22. In a dump car, the combination of an underframe, a car body mounted thereon for lateral dumping movement, mechanism for controlling the dumping movement of the car body carried by the underframe at one end thereof and positioned exteriorly of the adjacent end of the car body, said mechanism including a centrally positioned cylinder with piston rods projecting from each end thereof, a car body supporting strut and car body rocking link at each end of the cylinder and each operatively connected to be controlled by the adjacent piston rod, and a housing carried by the car body for protecting the combined struts and rocking links.

23. In a dump car, the combination of a car body mounted for dumping movement, a two part strut for supporting the car body in its normal righted position, the upper part being pivoted to the car body and normally depending from its pivotal connection and resting on the other part, and the other part being shiftable transversely of the car, and pneumatically actuated means for moving said other part to and from its operative position.

24. In a dump car, the combination of a tiltable car body, a strut for supporting the same in its righted position, tension means for drawing the car body towards its tilted position and pneumatically actuated means including a single cylinder and piston, the latter movable in one direction to effect a movement of the strut into an inoperative position and a pull on the tension means.

25. In a dump car, the combination of an underframe, a horizontally and transversely disposed cylinder provided with a piston and piston rod, a bearing block mounted on the underframe and operatively connected to be shifted transversely of the car by the piston rod, and a strut normally disposed to transmit off centered strain on the car body directly to the bearing block.

26. In a dump car, the combination of a car body, mounted for dumping movement in both lateral directions, means for supporting the car body in its normal righted position, pneumatically actuated means for selectively dumping the car body in the direction desired, said means including a single cylinder disposed transversely of the car having a piston normally centered in the cylinder and means controlled by the movement of the piston from its centered position in either direction for automatically removing the supporting means and dumping the car body on the side towards which the piston is moving.

27. In a dump car, the combination of a car body mounted for dumping movement in both lateral directions, means for supporting the car body in its normal righted position, pneumatically actuated means for selectively dumping the car body in the direction desired, said means including a single cylinder disposed transversely of the car having a piston normally centered in the cylinder and means controlled by the movement of the piston from its centered position in either direction for automatically removing the supporting means and dumping the car body on the side towards which the piston is moving, and for restoring the car body and its supporting means to their normal positions on the retreat of the piston towards its normal centered position.

28. In a dump car, the combination of an underframe, a car body mounted thereon for dumping movement, a sectional strut having one portion pivoted to the car body and its other portion supported by the underframe and adapted to be shifted transversely on its support to permit dumping of the car body, and pneumatically actuated mechanism operatively connected to dump the car body and to engage the lower end of the strut to swing the same laterally of the car and into an inoperative position.

29. In a dump car, the combination of a car body mounted for lateral dumping movement, a strut positioned exteriorly of and at one end of the car body for supporting the same in its normal righted position, and pneumatically actuated mechanism at said end of the car body for removing said strut from its operative position.

30. In a dump car, the combination of an underframe, a car body mounted thereon for dumping movement in both lateral directions, four struts for supporting the car body in its normal righted position, said struts disposed exteriorly of the ends of the car body, two at opposite ends and mounted on opposite sides of the longitudinal medial plane of the car, and pneumatically operated means for simultaneously removing from their operative position the two struts on the side of the car towards which it is desired to dump the car body.

31. In a dump car, the combination with a car body mounted for dumping movement and provided with a side door, a gravity controlled lock for securing the door in closed position, and pneumatically actuated mechanism for positively moving said lock into an inoperative position in advance of the dumping movement of the car body.

32. In a dump car, the combination with a car body mounted for dumping movement and provided with a side door, a combined strut and lock for supporting the car body in its normal position, and pneumatically actuated mechanism for simultaneously moving said combined strut and lock into an inoperative position.

33. In a dump car, the combination with a car body mounted for dumping movement and provided with a side door, a combined strut and lock for supporting the car body in its righted position and for securing the door in its closed position, pneumatically actuated mechanism for simultaneously moving said combined strut and lock into an inoperative position, and means controlled by the operation of said mechanism for dumping the car body.

34. In a dump car, the combination with a car body mounted for dumping movement and provided with a side door, a combined strut and lock for supporting the car body in its righted position and for securing the door in its closed position, pneumatically actuated mechanism for simultaneously moving said combined strut and lock into an inoperative position, and means controlled by the operation of said mechanism for dumping the car body subsequent to the movement of the strut.

35. In a dump car, the combination of a car body mounted for dumping movement and provided with a side door, a combined strut and door latch in the form of a bell-crank lever pivoted to the car body and including a vertical arm functioning as a strut for supporting the car body in horizontal position, and a horizontal arm constituting a latch for securing the door in closed position.

36. In a dump car, the combination of a car body mounted for dumping movement and provided with a side door, a combined strut and door latch in the form of a bell-crank lever pivoted to the car body and including a sectional vertical arm functioning as a strut for supporting the car body in horizontal position, and a horizontal arm constituting a latch for securing the door in closed position.

37. In a dump car, the combination of a car body mounted for dumping movement and provided with a side door, a combined strut and door latch in the form of a bell-crank lever pivoted to the car body and including a vertical arm functioning as a strut, a horizontal arm constituting a latch for securing the door in closed position, a shiftable support for the strut forming arm, and pneumatically actuated means for shifting the support to and from its operative position beneath the pivotal point of the bell-crank lever.

38. In a dump car, the combination of a car body mounted for dumping movement and provided with a side door, pneumatically actuated means operatively connected to effect the dumping of the car body, said means including a cylinder and piston, a gravity actuated latch for the side door, and means controlled by the actuation of the piston independently of the movement of the car body for moving the latch into inoperative position.

39. In a dump car, the combination of a car underframe, a car body mounted thereon for dumping movement and provided with a side door, a gravity actuated lock for the side door, pneumatically actuated mechanism carried by the underframe for tilting the car body laterally, said means including a cylinder having a piston actuated member, said lock having a part normally disposed in the path of movement of the piston actuated member and adapted to be engaged thereby to move the lock into unlocked position to permit the door to open as the car body is dumped.

40. In a dump car, the combination of a car underframe, a car body mounted thereon for dumping movement and provided with a side door, a gravity actuated lock for the side door, pneumatically actuated mechanism carried by the underframe for dumping the car body towards the side provided with the door, said means including a cylinder having a piston actuated member, said lock having a part normally disposed in the path of movement of the piston actuated member and adapted to be engaged thereby to move the lock into unlocked position to permit the door to open as the car body is dumped, said lock part being movable by gravity with the lock on the righting of the car body into engagement with said piston actuated member and into position to be actuated on the succeeding dumping action of the piston.

41. In a dump car, the combination of an underframe provided with a bearing guideway, a bearing block slidable in said guideway, a piston cylinder carried by the underframe and having its piston operatively connected to shift the block in the guideway, a car body mounted on the underframe for dumping movement, and a vertically disposed sectional body supporting member having one portion supporting on the bearing block and its other portion pivoted to the car body.

42. In a dump car, an underframe provided with a bearing guideway, a car body mounted on the underframe for dumping movement, a bearing block slidable in said guideway, a body supporting member carried by the bearing block and connected to the piston rod to shift transversely of the underframe upon movement of the piston, a rocking link pivotally connecting the body supporting member and car body to dump the latter upon movement of the piston, said body supporting member being provided with a seat, and a strut element pivoted to the car body and supported by said seat.

43. In a dump car, the combination of an underframe provided with a bearing guideway, a bearing block slidable in said guideway, a piston cylinder carried by the underframe and having its piston operatively connected to shift the block on the guideway, a car body mounted on the underframe for dumping movement, a combined strut element and rocking link pivotally connecting said block with the car body to dump the same and provided with a strut seat, and a strut element pivoted to the car body and supported by said seat.

44. In a dump car, the combination with a car underframe, of a car body mounted on the underframe for lateral dumping movement in both directions, pneumatically actuated means including a single cylinder mounted on and extending transversely of the underframe and having its piston rod projecting beyond the opposite ends of the cylinder and operatively connected at its opposite ends to the tiltable car body above its support on the underframe for selectively pulling the car body towards its dumped position and on the desired side depending upon the direction of movement of the piston in the cylinder.

45. In a dump car, the combination of a car body mounted for dumping movement in both lateral directions, pneumatically actuated means including a single cylinder for starting the car body selectively towards its dumped position, said cylinder having a piston and a piston rod, and a rocking link movable with the piston rod and car body to tilt the later.

46. In a dump car, the combination of a car body mounted to be tilted in both lateral directions, pneumatically actuated means for selectively tilting the car body in either direction desired and for righting the same, said means including a centrally disposed horizontal cylinder provided with a normally centered piston and piston rods projecting from opposite ends of the cylinder, connecting means between the car body and each piston rod operatively connected whereby a movement of the piston in one direction from its normal centered position will cause it to act through the connecting means on the advancing side to draw the car body into its tilted position and the subsequent retreat to normal position of the piston will cause it to act through the other connection to restore the car body to its righted position.

47. A car dumping mechanism including a cylinder, a piston slidably mounted therein and provided with piston rods projecting in opposite directions therefrom beyond the cylinder heads, a pair of shiftable bearing blocks operatively connected to be shifted by the piston rods, a pair of struts connected respectively one to each block, and each strut provided with a tension member for drawing a car body towards the same.

48. In a dump car, the combination of a dumping car body provided with a normally closed side door, a lock for said door, a strut for supporting the car body in its righted position in cooperative relation with the lock, a tension member for drawing the car body into its tilted position, and pneumatically actuated means including a cylinder, a piston and a piston rod, said rod operatively associated and disposed in its movement in one direction to effect a displacement of the strut and unlocking of the door lock and then a functioning of the tension member.

49. In a dump car, an underframe having at one end thereof a transversely arranged end construction, a car body mounted on the underframe for side dumping, the end of said body being inset from the end construction, a pair of struts arranged respectively on each side of the longitudinal center line of the car and disposed between the end of the body and the end construction to support the body in normal righted position, and pneumatically actuated mechanism supported by the end construction and arranged between the struts for shifting the latter into inoperative position to permit dumping of the body.

50. In a dump car, the combination of an underframe, a car body mounted thereon for lateral dumping movement and a body supporting strut having a locking element normally locked with said body, and pneumatically actuated mechanism supported on the underframe at opposite ends of the car body for moving said strut into an inoperative position to release the locking element from the body and for selectively dumping the car body in the direction desired, and a pair of housings, one at each end of the car body and each secured to the adjacent end of the car body for enclosing the contiguous struts and the major portion of the pneumatically actuated mechanism for interlocking and moving its associated strut.

51. In a dump car, the combination of an underframe, a car body mounted on the underframe for dumping movement, a strut element pivoted to the car body and depending relative thereto from its pivotal connection, a strut section supported by the underframe and having a seat with which the strut element is normally engaged whereby said strut section and strut element normally coact to retain the car body in normal righted position, and pneumatically actuated means including a piston rod acting horizontally to shift the strut section on the underframe to disengage said section from its engagement with the strut element to thus permit the car body to dump.

52. In a dump car, the combination of an underframe, a car body mounted thereon for side dumping, a side door, a strut element shiftable on the underframe and defining a support, a lock for the side door pivoted to the body and defining a second strut element, said lock being normally supported by the first named strut element to coact therewith to retain the body in righted normal position, and pneumatically actuated means including a piston rod acting on said first named strut element to move the same to release the second strut element from its supported position whereby the side door is freed from its lock.

53. In a dump car, the combination of a tiltable car body provided with a side door, a lock for said door, a strut for supporting the car body in its righted position, mechanical means for tilting the car body and pneumatically actuated means movable in one direction to effect sequentially first, a movement of the door lock into inoperative position, then a movement of the strut into an inoperative position and finally a movement of the mechanical tilting means into an operative position.

54. In a dump car, the combination of a car body mounted to be tilted in both lateral directions, struts at opposite sides of the car body for supporting the same in its righted position, pneumatically actuated means for selectively removing the strut on the side towards which the car body is to be tilted and for selectively tilting the car body in either direction desired and for righting the same, said means including a centrally disposed horizontal cylinder provided with a normally centered piston and piston rods projecting from opposite ends of the cylinder, connecting means between the car body and each piston rod and between each piston rod and its adjacent strut and operatively connected whereby a movement of the piston in one direction from its normal centered position will cause it to act through the connecting means on the advancing side to draw the car body into its tilted position and the subsequent retreat to normal position of the piston will cause it to act through the other connection to restore the car body to its righted position and to restore the struts to their operative positions.

55. In a dump car, the combination of a car body mounted for dumping movement and provided with a side door, pneumatically actuated means operatively connected to effect the dumping of the car body, said means including a cylinder and piston, a gravity actuated latch for the side door, and means independent of the movement of the car body and controlled by the actuation of the piston for moving the latch into an inoperative position.

56. In a dump car, the combination with a car underframe, of a car body mounted on the underframe for lateral dumping movement in both directions, pneumatically actuated means including a single cylinder mounted on and extending transversely of the underframe and having its piston rod projecting beyond the opposite ends of the cylinder and operatively connected at its opposite ends to the tiltable car body above its support on the underframe for selectively pulling the car body towards its dumped position and on the desired side depending upon the direction of movement of the piston in the cylinder.

In witness whereof I have hereunto set my hand.

ROBERT E. POWERS.